United States Patent
Lam et al.

(10) Patent No.: US 7,742,463 B2
(45) Date of Patent: Jun. 22, 2010

(54) SECURITY GATEKEEPER FOR A PACKETIZED VOICE COMMUNICATION NETWORK

(75) Inventors: Pak Kit Lam, Hong Kong SAR (CN); Kar-Wing Edward Lor, Castro Valley, CA (US)

(73) Assignee: Hong Kong Applied Science and Technology Research Institute Co., Ltd., Hong Kong SAR (CN)

( * ) Notice: Subject to any disclaimer, the term of this patent is extended or adjusted under 35 U.S.C. 154(b) by 1309 days.

(21) Appl. No.: 11/206,160

(22) Filed: Aug. 18, 2005

(65) Prior Publication Data

US 2007/0041362 A1  Feb. 22, 2007

(51) Int. Cl.
*H04L 12/66* (2006.01)
(52) U.S. Cl. .............. 370/352; 370/313; 370/241; 370/231
(58) Field of Classification Search .............. 370/352, 370/313, 241, 231, 196
See application file for complete search history.

(56) References Cited

U.S. PATENT DOCUMENTS

| | | | |
|---|---|---|---|
| 5,828,893 A | 10/1998 | Wied et al. | |
| 6,055,229 A * | 4/2000 | Dorenbosch et al. | 370/313 |
| 6,356,529 B1 * | 3/2002 | Zarom | 370/231 |
| 6,798,786 B1 | 9/2004 | Lo et al. | |
| 7,031,297 B1 * | 4/2006 | Shabtay et al. | 370/352 |
| 2003/0112942 A1 * | 6/2003 | Brown et al. | 379/196 |
| 2005/0068935 A1 | 3/2005 | Bajko et al. | |
| 2006/0198310 A1 * | 9/2006 | Stieglitz et al. | 370/241 |

OTHER PUBLICATIONS

International Search Report, Jul. 31, 2007.

* cited by examiner

*Primary Examiner*—Quynh H Nguyen
(74) *Attorney, Agent, or Firm*—Buchanan Ingersoll & Rooney PC

(57) ABSTRACT

Admission control means for controlling admission of traffic into a voice communication network, the admission control means comprises means for examining a call control message of a call control dialogue when admission of said traffic into said voice communication network is requested, the admission control means admit a traffic into said voice communication network only if the call control message accompanying the traffic admission request satisfies a pre-determined admission criterion.

24 Claims, 6 Drawing Sheets

SECURITY GATEKEEPER FOR A PACKETIZED VOICE COMMUNICATION NETWORK

FIELD OF THE INVENTION

This invention relates to packetized voice communication and, more particularly, to admission control of data packets into a packetized voice communication network. More specifically, this invention relates to a security gatekeeper for a VoIP network.

BACKGROUND OF THE INVENTION

Local area networks (LANs) are increasingly used for carrying telephony services within an organisation or a corporate environment. For the sake of enhanced security, reliability and guarantee of QoS (quality of service), telephony services in a LAN environment are typically carried by packetized voice data traffic using VoIP (voice-over-internet protocol) technology and are separated from ordinary data traffic by segregation of LANs, for example, by VLAN (virtual LAN). A LAN which is dedicated to VoIP telephony services is referred to as a trusted LAN in this specification because of the more stringent demand on service security, reliability and network robustness. On the other hand, a LAN for carrying ordinary data traffic, including a combination of voice and data traffic, is referred to as an "un-trusted network". The segregation of voice and data LANs means that devices connected to the segregated LANs cannot communicate among themselves directly via the Data Link Layer (layer 2 of the OSI 7-layer model) and communication between such devices will have to take place via an upper layer, that is, the Network Layer.

To safeguard service integrity of a trusted voice network, devices are admitted into the trusted voice network upon satisfactory authentication. Authentication before admission does not pose a major problem for special IP-phones which have a built-in authentication mechanism. However, pre-admission authentication does pose difficulties for devices without dedicated authentication means, such as, for example, "off-the-shelf" IP phones or soft-phones which are software based VoIP applications running on devices connected to an un-trusted network.

While the segregation of voice and data networks enhances security, reliability and robustness of a trusted voice network by mitigating the risks of spread-over damage due to malicious attack on the un-trusted network, this also poses severe, if not impossible, limitations to communications between voice devices respectively connected to the trusted and un-trusted networks. For example, soft-phones or IP-phones connected to an un-trusted network but without dedicated authentication means will have to go through normal or public internet channels in order to establish voice communication with voice devices connected to the trusted network. However, traffic through normal public internet channels are typically safeguarded by a corporate firewall which is usually configured to block all UDP based media traffic. As a result, there can be no voice communications between such devices without compromise to the security of the trusted network.

To enhance deployment flexibility, it is desirable that telephony devices connected to a trusted network (which will be referred to as "trusted voice devices" (TVDs) below) and telephony devices connected to an un-trusted network (which will be referred to as "un-trusted voice devices" (UVDs) below) can communicate with each other. However, this flexibility must be on the basis that deployment costs are not substantially increased and security of the networks is not compromised by lowering the security thresholds. Compromise in network security is not acceptable and defeats the initial purposes of having segregated networks for trusted and un-trusted devices. This is currently impossible in a segregated VLAN environment mentioned above.

Throughout this specification, the term "Layer" means and refers to a Layer as defined under the OSI (open system interconnection) protocol model, unless the context otherwise requires, the terms "trusted network", "voice LAN" and "trusted voice network" are equivalent and used interchangeably, and the terms "un-trusted network", "data LAN" and "data network" are equivalent and used interchangeably. A description of VLAN techniques can be found in, for example, "IEEE Standard for Information technology—Telecommunications and information exchange between systems—IEEE standard for local and metropolitan area networks—Common specifications—Part 3: Media access control (MAC) Bridges, ANSI/IEEE Std 802.1D, 1998 Edition". This documentation is incorporated herein by reference.

OBJECT OF THE INVENTION

Accordingly, it is an object of this invention to provide admission control to a trusted network which alleviates shortcomings of conventional admission control means. At a minimum, it is at least an object of this invention to provide a useful choice of admission control means for a packetized voice network for the public.

SUMMARY OF THE INVENTION

According to this invention, there is provided means and methods of admission control whereby traffic from a device connected to an un-trusted network can be admitted to a trusted network based on examination of a higher layer call control protocol.

According to a preferred embodiment of the present invention, there is provided admission control means for controlling admission of traffic into a voice communication network, the admission control means comprises means for examining a call control message of a call control dialogue when admission of said traffic into said voice communication network is requested, the admission control means admit a traffic into said voice communication network only if the call control message accompanying the traffic admission request satisfies a pre-determined admission criterion.

Preferably, said call control message contains information of a caller and the pre-determined admission criteria comprise the identity of said caller as an admissible caller.

Preferably, said call control message contains information of a call destination and the pre-determined admission criteria comprise the identity of said call destination as an admissible call destination.

Preferably, said call control message contains information of a server from which the traffic admission request is sent and the pre-determined admission criteria comprises the identity of said server as an admissible server.

Preferably, a traffic admission request from a non-admissible server destination is blocked from entry into said voice communication network.

Preferably, said call control message contains information of the type of medium content for which the traffic admission request is made, the pre-determined admission criteria comprises the type of medium content as an admissible content-type.

Preferably, admissibility of a medium content-type is varied according to the state of said voice network.

Preferably, a call control protocol of a pre-determined protocol sequence is used for making a traffic admission request, a traffic admission request with a protocol sequence not according to said pre-determined protocol sequence is blocked.

Preferably, said call control message contains information of media protocol and the pre-determined admission criteria includes media protocols which are supported by said voice communication network as an admissible media protocol.

Preferably, said call control message contains information of the length of content for which the traffic admission request was made, the pre-determined admission criteria comprises a length of content not exceeding a prescribed maximum admissible content-length.

Preferably, the maximum admissible content-length is varied according to medium content-type of the traffic for which admission is requested.

Preferably, said call control message contains information of a forwarding destination and the pre-determined admission criteria includes said forward destination as an admissible forwarding destination.

BRIEF DESCRIPTION OF THE DRAWINGS

Preferred embodiments of the present invention will be explained in further detail below by way of examples and with reference to the accompanying drawings, in which:—

DETAILED DESCRIPTION OF THE PREFERRED EMBODIMENTS

Figure 1:
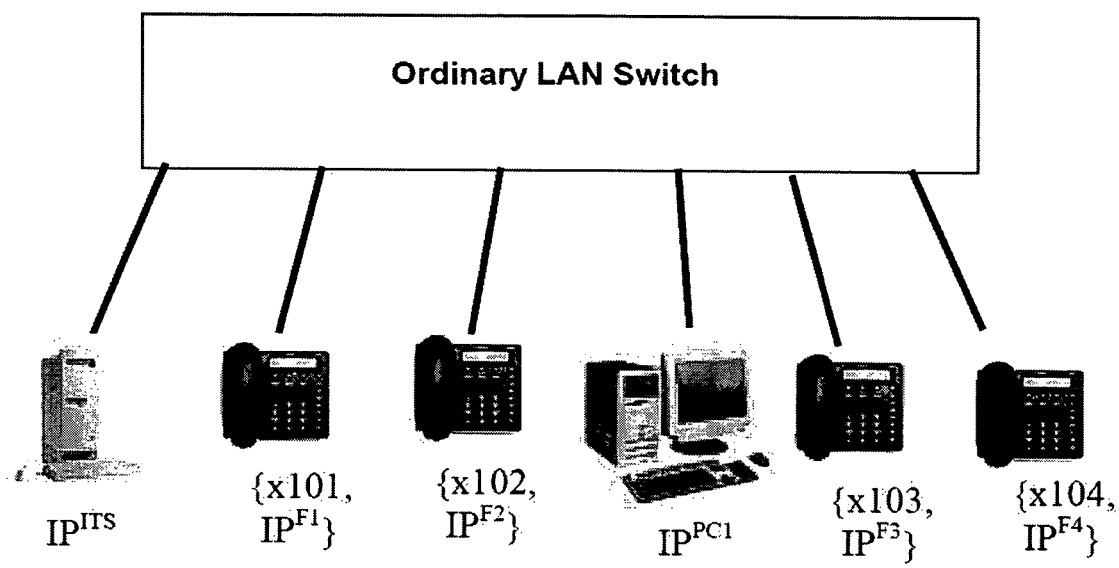
FIG. 1 shows an exemplary local area network (LAN) with converged data and VoIP applications connected to a conventional LAN switch and controlled by an IP telephony server.

An exemplary conventional network of VoIP application which is built on an exemplary Local Area Network (LAN) is shown in FIG. 1. This voice network comprises a LAN switch for Layer 2 data switching, a plurality of IP phone devices and an IP telephony server (ITS). Each IP phone device has a characteristic IP address $IP^{Fx}$ and an internal phone extension number (for example, 101-104). The ITS is allocated an IP address ($IP^{ITS}$) and all the relevant network entities are connected to the LAN switch. Since all the entities are connected to the same data network, they are assigned IP addresses of the same IP subnet work.

In a telephone call session between two phone devices in a typical VoIP environment, an exchange of call control signaling protocols for establishing a call session will take place before packetized voice medium data traffic will flow between phone devices. Call control signaling in VoIP is based on VoIP dialogue and by way of exchange of call control messages. A VoIP dialogue is an application layer call control message or call control dialogue which contains call information, such as, for example, caller ID, callee ID, call ID, media type etc. Such call information is essential to support the more complex features of telephony, such as, for example, multi-party conferencing, call forwarding, call transfer, call parking, call pick-up, etc. call set-up. As another example, in a corporate environment, the IT policy may allow calls to a party but prohibiting call forwarding to other parties. Such features can be accomplished by a higher-layer call control protocol but not a lower layer protocol such as transport layer protocol.

Conventional firewall protection is based on lower-layer protocol access rules which are only effective for admission control of transport or network layer protocols such as TCP/UDP and IP, it is not effective for admission control of higher-layer protocols, such as call control signaling protocols in VoIP applications. For example, conventional firewall cannot discriminate admission into a network based on user IDs and/or user phone numbers of the caller or the callee.

The Traffic Identification Procedure (TIP) is a set of dynamic and stateful access rules for admission control of application layer protocols such as SIP. TIP is dynamic in the sense that it can adapt to a real-time situation, for example, different TIP rules can be applied according to the processing bandwidth. TIP is stateful in the sense that it can be self-adjusted according to the state of a call. For example, after a call has been set up between parties, call set-up procedures will be blocked until the previous call has been terminated. Although the admission control below will be illustrated with reference to Session Initiation Protocol (SIP), this is merely for convenience and it should be understood that the application applies mutandis mutatis to other protocols without loss of generality.

As a background reference, SIP is a text-based application-layer control protocol which is based on the client-server model. SIP messages are typically of the type requests and responses. Requests are generated by one entity (the client) and sent to a receiving entity (the server) which responds them. A request invokes a method which can be sent either over TCP or UDP. SIP currently comprises six methods, namely, INVITE, ACK, OPTIONS, BYE, CANCEL and REGISTER. The INVITE method is used to initiate a call between a client and a server and is the most important method. SIP uses Session Description Protocol (SDP) for media description. SIP is quickly becoming a prevalent signaling protocol for VoIP applications and is detailed in the IETF (Internet Engineering Task Force) RFC 3261 standard protocol which is incorporated herein by reference.

In a VoIP telephony environment based on SIP, an exchange of SIP call control signaling messages will take place before RTP (Real-time Transport Protocol) sessions are established for carrying voice medium traffic between phone devices. Specifically, each VoIP call is represented by two types of traffic, namely, call control traffic and media (voice) traffic. Voice traffic is switched or routed from one designated port to another designated port after a voice connection has been set up between two or more parties through a VoIP server. After a call has been set up, media streams are switched between the devices to facilitate media communication.

An SIP-based IP telephony network comprises a plurality of clients (IP phone devices) and servers which communicate in SIP. There are many types of servers and each of the servers plays a specific role. For example, a Registration Server registers clients into the SIP telephony network, a Location Server keeps a register of client identifications such as resource identifiers, extension numbers, or device IP addresses. A Proxy Server directs SIP messages to appropriate destinations. A Proxy Server can either be stateful or stateless. A stateful Proxy Server remembers the incoming and outgoing requests. A stateless Proxy Server has no such memory and forgets all information once an outgoing request is generated. It will transpire from the description below that an SSG of this invention possesses the characteristics of a stateful VoIP Proxy Server, whereas the Trusted Voice Server (TVS) possesses the characteristics of either a stateful or stateless VoIP Proxy Server.

The admission control of this invention is exemplified by a Session Security Gatekeeper ("SSG") which serves to admit voice traffic from an un-trusted network into a trusted network upon satisfaction of certain predetermined criteria. Such admission criteria are collectively referred to as a set of Traffic Identification Control Procedures (TIP) below. The SSG serves a primary role of a security admission gatekeeper at the entrance of a trusted voice network to defend the former from possible malicious attack. In use, a voice network is configured so that all data packet traffic which enters a trusted voice network from an un-trusted network must pass through the SSG by means of an IP address of the SSG published to the un-trusted network. Note that the IP address of the SSG is accessible from the un-trusted network as the voice server for IP telephony, although the SSG does not really process the calls. The actual call processing is performed by the trusted voice server (TVS) on the trusted voice network, but the IP address of the TVS is not accessible or published to the un-trusted network. In particular, all packet traffic which attempts to enter a trusted voice network from an un-trusted network must negotiate with the SSG during entry to the voice network. Upon successful negotiation, packetized voice data traffic will be admitted into the trusted voice network from an un-trusted network. Otherwise, the data traffic will be blocked or rejected by the SSG Thus, the SSG would appear to external un-trusted IP phone devices as a voice Proxy Server. In this specification, the term "un-trusted IP phones devices" means IP phone devices which are connected to an un-trusted network. The un-trusted network can be the logically segregated data sub-network or an external un-trusted hybrid LAN carrying both voice and data traffic. Un-trusted IP phone devices include off-the shelf IP phones without prescribed authentication means as well as software based IP phones, which are commonly known as soft-phones. In the description below, trusted IP phone devices and un-trusted IP phone devices are respectively referred to as TVD (trusted voice devices) and UVD (un-trusted voice devices) for convenience.

To accomplish the gate-keeping or admission control role, the SSG is equipped with traffic identification means to examine the admissibility of a packet or packet traffic that requests for entry into the voice network from an un-trusted data network. The packet or packet traffic will be admitted into the trusted voice network only if it is a genuine voice traffic packet which is classified as admissible under the TIP, otherwise, it will be blocked. To examine on the admissibility of incoming call control packets, TIP are utilized and a set of Traffic Identification Procedure (TIP) is implemented in the SSG as traffic identification means. Exemplary TIP rules of call admission and their applications are described below with reference to the flow chart of FIG. 2.

1. The Identity of Both the Called and Calling Party.
   a. Only calls from a group of identifiable or pre-determined users are accepted. For example, only calls from employees and/or identified external contacts are admitted.
   b. Only calls initiated from or destined to employees and the PSTN server are allowed.
   c. Certain or selected users ("black-listed" users) are blocked from entering the trusted network.

The above can prevent the TVS (trusted voice server) from being compromised by unknown parties outside the trusted network.

2. The Identity of the Server or Host from which a Call-Control Massage is Sent.
   a. Only call control messages from a known server or host are admitted.

For example, a SIP server from a subsidiary in another country, a SIP server from the service provider, or a SIP server from a known customer.
   b. Messages from a particular or a selected server or host are blocked.
   c. This prevents the TVS from receiving messages from unknown or dangerous hacker sites.

3. Content Type of the Message.
   a. Only predetermined content types are admitted into the trusted network. For example, SDP or MIME/ISUP.
   b. Messages with some particular or predetermined content-type will be blocked. For example, SMIME.
   d. This prevents a TVS from processing potentially destructive contents or attachments.

4. Content Length.
   a. Only messages not exceeding a predetermined maximum content-length are accepted. The admissible maximum content-length can be content specific, for example, 1,200 bytes for voice application or 1 megabytes for other multimedia application. The maximum admissible content-length will be automatically varied by the SSG according to the type of medium requesting for transit.
   b. To maintain un-interrupted operation of the trusted voice network when the available bandwidth is running low, TIP may be configured to accept only voice calls and to block requests for passage of other media (or multimedia) applications when the available bandwidth drops below a prescribed threshold.
   c. This prevents a TVS from processing huge messages which may consume large portion of CPU power.

5. Message Sequence
   a. Each protocol has a particular or a pre-determined sequence of messages during the call setup or tear-down. The sequence of a message that is out-of-order or repeated abnormally (e.g., repeated for 10 times or more) will be blocked.

This prevents the TVS from potential DDOS attacks.

6. The Format of Contents is Checked Against Content-Type
   a. E.g., if the content-type specified is SDP, the SSG can be configured to block messages with any unknown SDP fields (according to RFC 2327).

This prevents the TVS from processing potentially destructive content.

7. Media Protocol
   a. Only messages with supported media protocols are admitted. E.g., PCMU/8000.
   b. Messages with some particular media protocols can be blocked.

This prevents the TVS from processing unknown or destructive media protocols.

8. Media Connection Address
   a. Sometimes a caller or callee may direct the media to a particular server (e.g., voicemail server) other then the device used for signaling. In this case, the SSG can be configured to accept only a set of known addresses that the media data sent from the TVS can be addressed to.

b. The SSG can be configured to specifically block messages requesting the TVS to forward the media to a potentially dangerous media server.

This prevents the TVS from sending the media content to an unknown media server.

From the above, it will be noted that the SSG is stateful with a set of operation parameters which are varied according to the state of operation.

TIP can be placed into an XML file. A graphical user interface (GUI) can be implemented to access the XML for easy enabling/disabling the rules and configuring the values. Note that this configuration file must be logically located on the Legacy Operating System (LOS) so that people from the un-trusted network has no way to access it (Note that people from the un-trusted network can only access the Virtual Operating System (VOS), which will be described in detail later). The SSG configuration engine may read this file from an Inter-Process Communication (IPC) Channel. The following is an example of the XML based configuration file.

```
****************************************************************
<?xml version="1.0" ?>
<!-- Basic SSG Configuration -->
  <ssg-config> <!-- SSG general configuration --> <Allowed-
Attachment>sdp</Allowed-Attachment> <!-- SIP header rules -->
<To>all</To>
  <From>1234,5458,9000,5457,2000</From>
  <Via>10.3.4.5, 10.5.6.186, 10.5.4.57,12.34.56.78</Via>
  <Content-Type>application/sdp</Content-Type>
  <Content-Length>1000</Content-Length>
<!-- SDP header rules --> <Owner-Address>all</Owner-Address>
<Connection-Address>all</Connection-Address> <Media-Type>all</
Media-Type> <Media-Protocol>all</Media-Protocol> </ssg-config>
****************************************************************
```

In the above exemplary configuration file, the SSG is configured with these TIP rules:

1. Only accept "SDP" as the content-type.
2. Accept all called party.
3. Only accept these calling parties: 1234, 5458, 9000, 5457, 2000.
4. Only accept messages sent from these servers: 10.3.4.5, 10.5.6.186, 10.5.4.57 and 12.34.56.78.
5. Only accept a content-length of 1000 bytes or less.
6. Accept all media protocol.
7. Allow the media to be addressed to all media servers.

Figure 2:
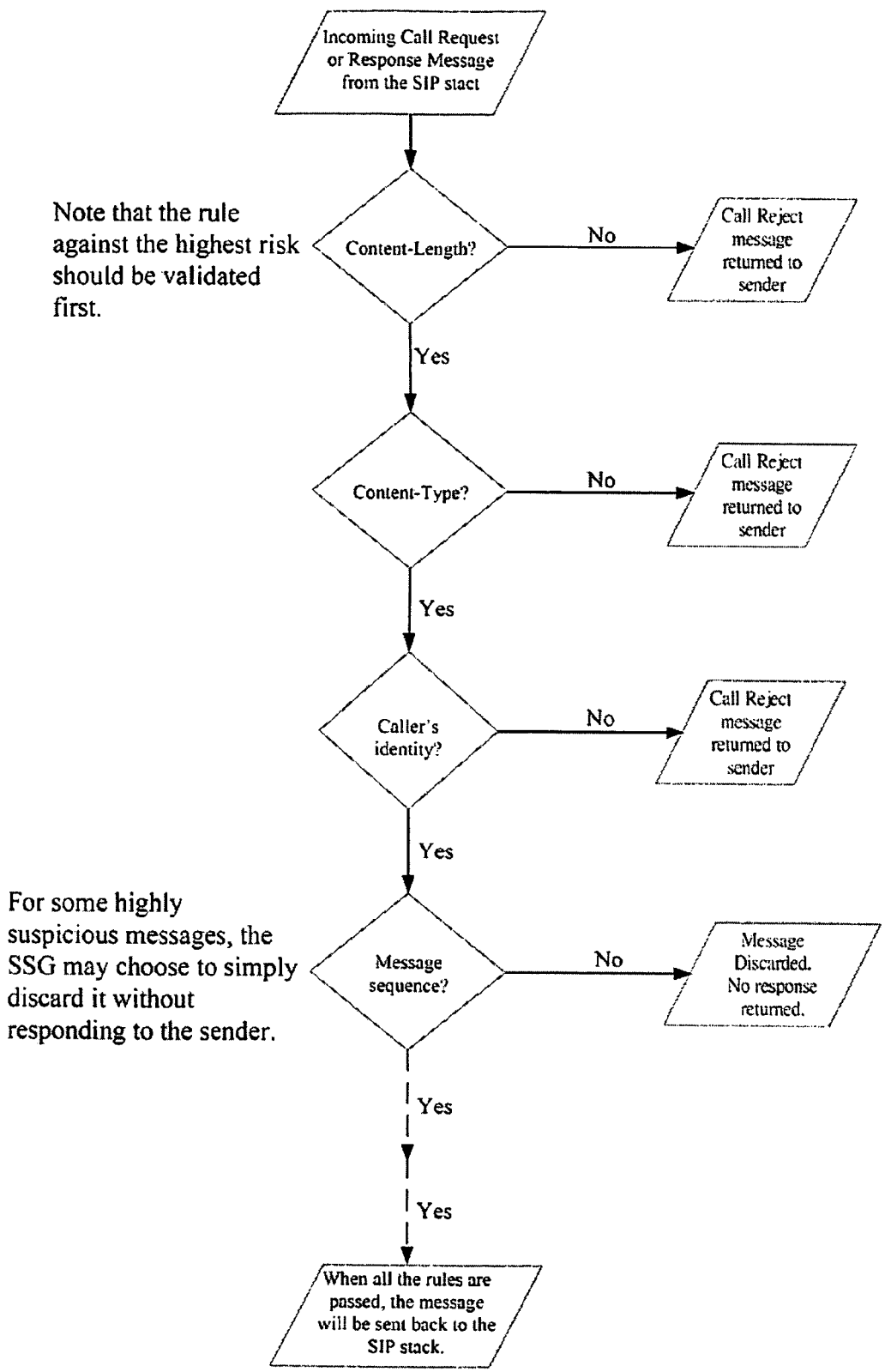
FIG. 2 is a flow chart showing the principles of Traffic Identification Procedure (TIP)

FIG. 2 is a flow chart showing an exemplary implementation of TIP rules.

Figure 3:
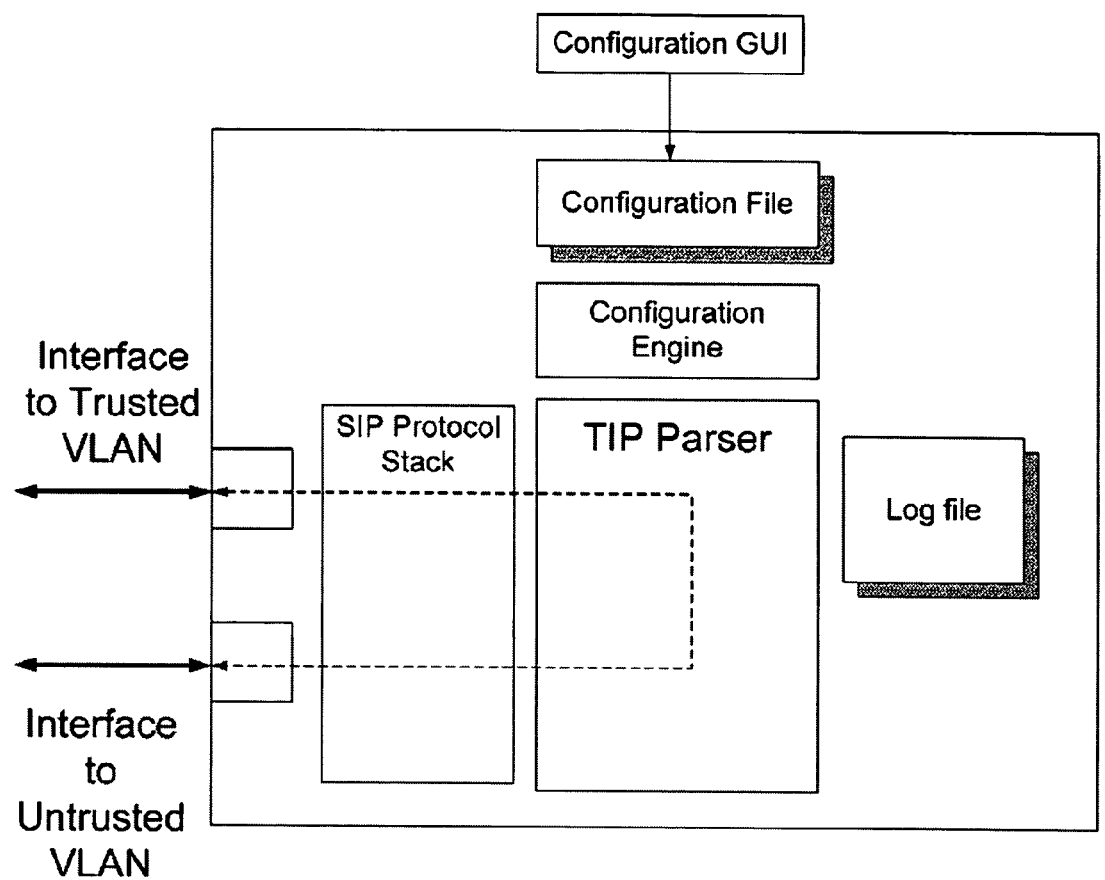
FIG. 3 is a block diagram showing an exemplary logical architecture of an SSG.

A block diagram of an exemplary implementation of an SSG is shown in FIG. 3, the SSG of FIG. 3 comprises:—

1. XML based configuration file—may interact with a GUI.
2. A configuration engine—reads the configuration info from the configuration file, then configures the TIP parser.
3. TIP Parser—Performs the TIP. Sends logging info to the log file.
4. SIP protocol stack—a RFC 3261 compliant SIP stack that parses the incoming messages before sending them to the TIP validator. It also packages the outgoing SIP messages after the TIP validator accepts them into (for requests) or out of (for responses) the trusted network.]
5. Interface to the trusted and un-trusted VLANs—The logical interface connected to the trusted network and un-trusted network. They can be, however, physically connected to the same or different cables.

An Exemplary Network with SSG Deployment

Figure 4:
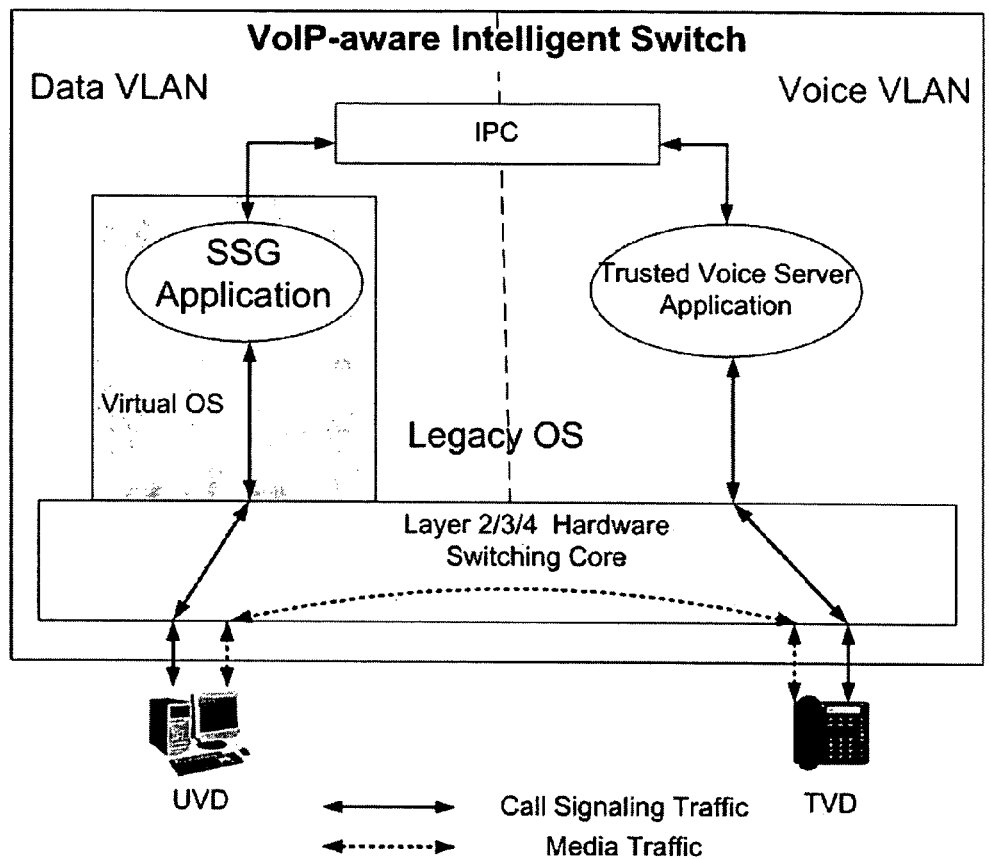
FIG. 4 shows an exemplary logically segregated voice and data VLANs deployed with an SSG of FIG. 3.

FIG. 4 shows an exemplary deployment of the SSG in an exemplary corporate network environment in which a physical LAN is logically segregated into a voice VLAN and a data VLAN. The voice VLAN and the data VLAN are connected and segregated by an intelligent VoIP aware switch $IP^{SW}$ which serves PBX functions. The intelligent switch segregates the voice network from the data network at Layer 2 and beyond. Specifically, the networks are logically segregated at Layer 2, Layer 3, Layer 4 and optionally at Layer 5 as well. The SSG is resident in the data side and serves as a front end gatekeeper for the voice VLAN.

Since the IP address of the SSG is known and the SSG is directly accessible from the un-trusted LAN, malicious attacks may be launched against the SSG through the UVDs. To alleviate the risks of possible damage to the TVS and the legacy operating system (LOS), SSG applications are run on a Virtual Operating System (VOS) which is an embedded operating running in top of the LOS. The VOS is a minimized operating system with only of a subset of functions of the LOS and only utilize a small and limited part of the system resources. For example, a smaller memory size, a smaller virtual memory size, a smaller file size, a smaller pipe size, a smaller stack size and less CPU time compared to the LOS are allocated to the VOS.

Since the VOS is recognized as the "true" operating system from the perspective of the un-trusted network, the LOS will be substantially shielded from malicious attacks from the un-trusted network. When the SSG is defeated, some or all of the allocated resources in the VOS will be consumed and the VOS will die gracefully while the voice LAN VoIP infrasturcture, which is running on the LOS, will remain substantially undamaged. Hence, the SSG may be viewed as a "sacrificible" frontier of the trusted voice network. Of course, it will be appreciated that once the SSG is down, all UVDs will not be able to communicate with the TVDs and existing calls between TVDs and UVDs will be terminated. However, calls between TVDs and calls between TVDs and the PSTN will not be adversely affected.

An exemplary application of the SSG is illustrated below with reference to the block diagram of FIG. 5. When a UVD makes an IP phone call to a TVD, it will make a call setup request by sending INVITE to the SSG. In response, the SSG will examine the call setup message INVITE to determine whether the call setup message INVITE is that of a genuine voice call. If the call setup message INVITE is genuine, it will comply with the set of prescribed admission rules as set out by the TIP. If positive, the SSG will forward the call setup message INVITE to a server (the "trusted VoIP server" (TVS)) of the trusted voice network. If negative, the call setup message will be dropped and a 403 forbidden or "call reject" message will be returned to the UVD.

If the call setup message passes the initial test, media traffic will begin to flow between the trusted and un-trusted devices. However, the SSG will keep track on the call states after the initial call setup by examining subsequent call control messages which attempts to enter the trusted voice network from the un-trusted data network. Typical subsequent call control message are, for example, messages for setting up more advanced call features such as call transfer, call park, call pickup, call on hold, call termination and other features known to persons skilled in the art.

On the other hand, when a TVD in a trusted network makes a call to a UVD, the TVD will start by sending a call setup request by sending INVITE to the TVS. The TVS will then forward the call setup request INVITE to the SSG through an inter-process communication (IPC) channel. Since the INVITE request is from a trusted device in the trusted network for making a call to the untrusted network, there is no real need for the SSG to examine the authenticity of such a call request. However, when a response ACK or 200 OK is returned from a UVD, the SSG is needed to examine the ACK or 200 OK responses from the UDV to ensure that the ACK response is genuine and complies with the TIP. If the ACK complies with TIP, the SSG will forward the ACK or 200 OK to the TVS through the IPC channel. If the ACK or 200 OK response do not comply with the TIP, the ACK or 200 OK message will be dropped by the SSG and the SSG will return a 403 forbidden or call reject message to the UVD.

In the above, it will be appreciated that examination of INVITE and 200 OK are of particular importance since extremely dangerous or bogus attachments can be carried by the control signals INVITE and 200 OK.

Figure 5:
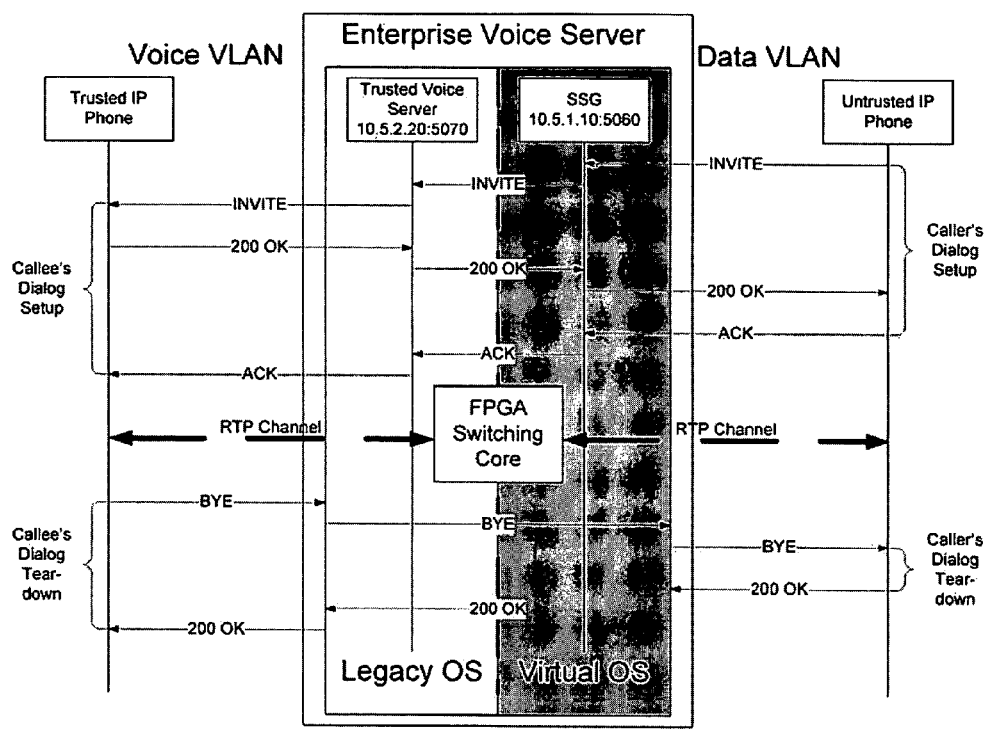
FIG. 5 is a block diagram illustrating an exemplary call setup sequence between two phone devices respectively connected to the data VLAN and voice VLAN of FIG. 4.
Figure 6:
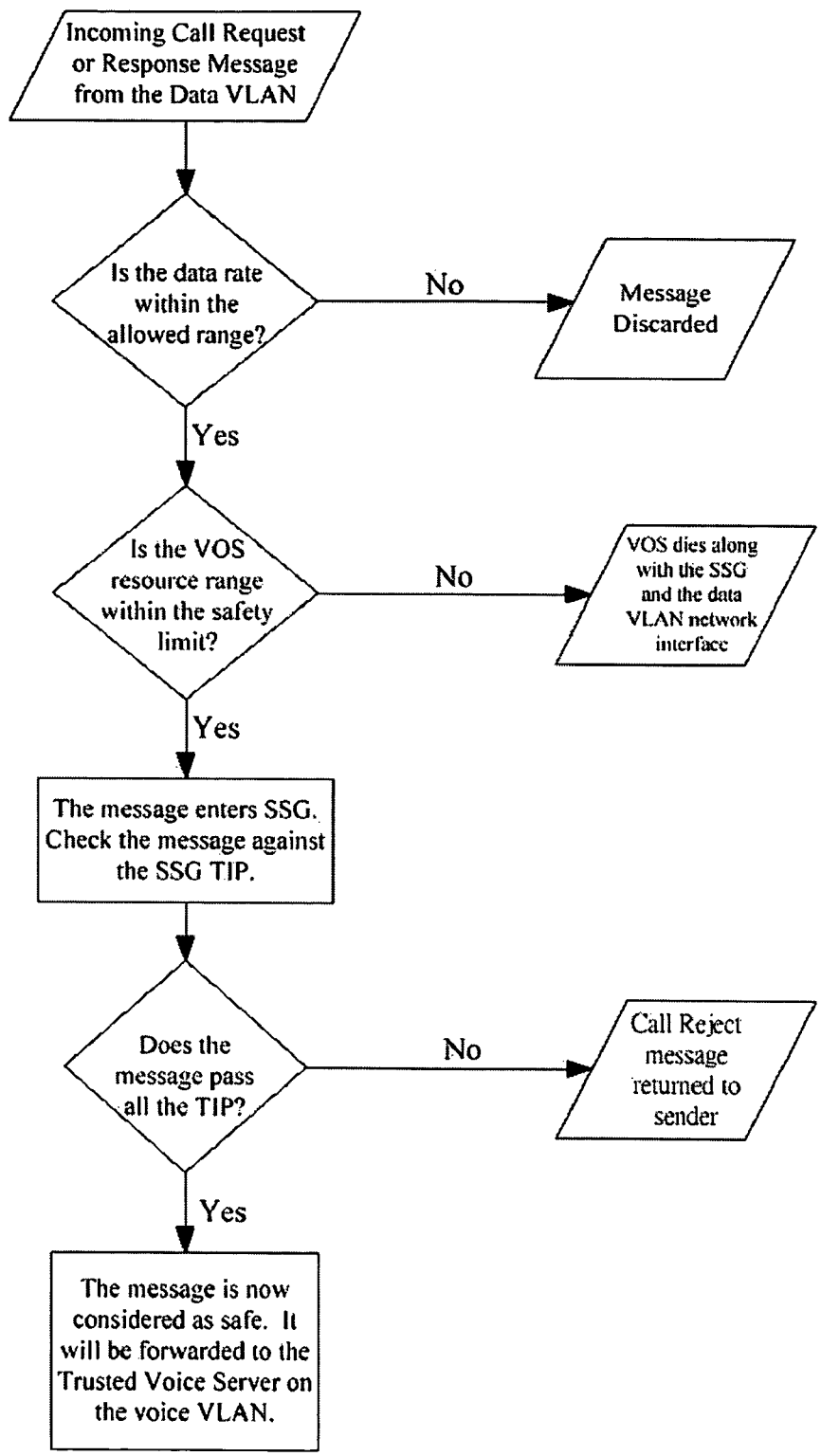
FIG. 6 is an exemplary flow diagram of the operation of an SSG in the network environment of FIGS. 4 and 5.

FIG. 6 shows an exemplary operation flow diagram with the SSG in the network environment of FIGS. 4 and 5. Referring to FIGS. 4-6, when a call request or response message originating from the un-trusted data VLAN seeks entry into the trusted voice VLAN, the VOS will first examined the data rate of the incoming packet to ensure that the incoming data will not jam the voice network. Such a call request or response message may be, for example, a call request from a UVD to a TVD or a response message by a UVD in response to a call request from a TVD. If the data rate or bandwidth of an incoming packet exceeds a predetermined threshold, the call request or call response message will be dropped since it is likely to be bogus or malicious. When setting the threshold bandwidth, the criterion is chosen to be a bandwidth which will correspond to the maximum bandwidth of a genuine voice call control traffic. An exemplary bandwidth threshold is set at 10 kB/s, since SIP call control traffic messages heading towards the SSG should not exceed several kilobytes per second for a genuine voice call. Of course, the threshold bandwidth can be configurable according to applications.

If the incoming message passes the bandwidth test, the VOS of the SSG will ascertain whether the resources allocated to the VOS resources is still at a safety level. If the remaining VOS system resources are not at a safe level, the SSG will die gracefully. If the VOS system resource test is passed, the message will be forwarded to the SSG. After the SSG has received the packet, a TIP will be performed. If the incoming message passes the TIP test, the message is considered safe and will be forwarded to the Trusted Voice Server on the voice VLAN with subsequent establishment of the medium traffic. Otherwise, the message will be dropped or discarded and a call reject message will be sent to the sender.

While this invention has been explained by reference to the examples or preferred embodiments described above, it will be appreciated that those are only examples to assist understanding of the present invention and shall not be construed as restrictive to the scope of invention. In particular, variations or modifications which are obvious or trivial to persons skilled in the art, as well as improvements made thereon, should be considered as an equivalent version of this invention.

Furthermore, while the present invention has been explained by reference to a VoIP system using SIP, it should be appreciated that the invention can apply, whether with or without modification, to other voice-over-packet communication systems without loss of generality.

The invention claimed is:

1. An admission control device that controls admission of voice packet traffic originating from a device on a network of non-authenticated devices into a packetized voice communication network for authenticated voice devices, said voice packet traffic comprising: call control packets and voice data packets, wherein the admission control device
   examines one or more call control packets of a call control message in a VOIP (Voice Over Internet Protocol) call control dialogue when admission of voice packet traffic into said packetized voice communication network is requested, and
   allows admission of said voice packet traffic into said packetized voice communication network only if the VOIP (Voice Over Internet Protocol) call control message accompanying the voice packet traffic admission request satisfies a pre-determined admission criterion, wherein said VOIP call control message contains information of a type of medium content for which the traffic admission request is made, the pre-determined admission criteria comprises the type of medium content selected from group including SDP, MIME or ISUP as an admissible content-type.

2. The admission control device according to claim 1, wherein said VOIP (Voice Internet Protocol) call control message contain information of a caller and the pre-determined admission criteria comprise the identity of said caller as an admissible caller.

3. The admission control device according to claim 2, wherein said admissible caller includes an employee of a corporate in legitimate control of the packetized voice communication network and the public telephony network (PSTN).

4. The admission control device according to claim 2, wherein a traffic admission request from a non-admissible caller is blocked from entry into said packetized voice communication network.

5. The admission control device according to claim 1, wherein said VOIP (Voice Over Internet Protocol) call control message contains information of a call destination and the pre-determined admission criteria comprise the identity of said call destination as an admissible call destination.

6. The admission control device according to claim 5, wherein a traffic admission request from a non-admissible call destination is blocked from entry into said packetized voice communication network.

7. The admission control device according to claim 1, wherein said VOIP (Voice Over internet Protocol) call control message contains information of a server from which the traffic admission request is sent and the pre determined admission criteria comprises the identity of said server as an admissible server.

8. The admission control device according to claim 7, wherein a traffic admission request from a non-admissible server destination is blocked from entry into said packetized voice communication network.

9. The admission control device according to claim 1, wherein admissibility of a medium content-type is varied according to the state of said packetized voice network.

10. The admission control device according to claim 1, wherein a traffic admission request for a non-admissible content-type is blocked from entry into said packetized voice communication network.

11. The admission control device according to claim 1, wherein said non-admissible medium content-type includes SMIME.

12. The admission control device according to claim 1, wherein the content format is also examined, the pre-determined admission criteria comprises an admissible content format for an admissible content-type.

13. The admission control device according to claim 1, wherein a VOIP (Voice over Internet Protocol) call control protocol of a pre-determined protocol sequence is used for making a traffic admission request, a traffic admission request with a protocol sequence not according to said pre-determined protocol sequence is blocked.

14. The admission control device according to claim 1, wherein said VOIP (Voice Over Internet Protocol) call control message contains information of media protocol and the pre-determined admission criteria includes media protocols which are supported by said packetized voice communication network as an admissible media protocol.

15. The admission control device according to claim 1, wherein said VOIP (Voice Over Internet Protocol) call control message contains information of the length of content for which the traffic admission request was made, the pre-determined admission criteria comprises a length of content not exceeding a prescribed maximum admissible content-length.

16. The admission control device according to claim 15, wherein the maximum admissible content-length is varied according to medium content-type of the traffic for which admission is requested.

17. The admission control device according to claim 16, wherein said admissible content length for voice application is 1,200 bytes.

18. The admission control device according to claim 16, wherein said admissible content length for multimedia applications other than voice is 1 M bytes.

19. The admission control device according to claim 1, wherein said VOIP (Voice Over Internet Protocol) call control message contains information of a forwarding destination and the pre-determined admission criteria includes said forward destination as an admissible forwarding destination.

20. The admission control device according to claim 1, wherein said traffic control dialogue is SIP based.

21. The admission control device according to claim 1, further allows determination of bandwidth of a traffic control message and rejection of a traffic control message if the bandwidth of said control message exceeds a preset threshold.

22. The admission control device according to claim 21, wherein said pre-set threshold bandwidth being 10 kB/s.

23. The admission control device according to claim 1, wherein the pre-determined admission criterion is varied according to instantaneous state of traffic in said packetized voice communication network.

24. A VoIP telephony network comprising admission control device claim 1.

* * * * *